No. 732,684. PATENTED JUNE 30, 1903.
C. J. ZILLGITT.
SPRING WHEEL.
APPLICATION FILED FEB. 27, 1903.
NO MODEL. 2 SHEETS—SHEET 1.
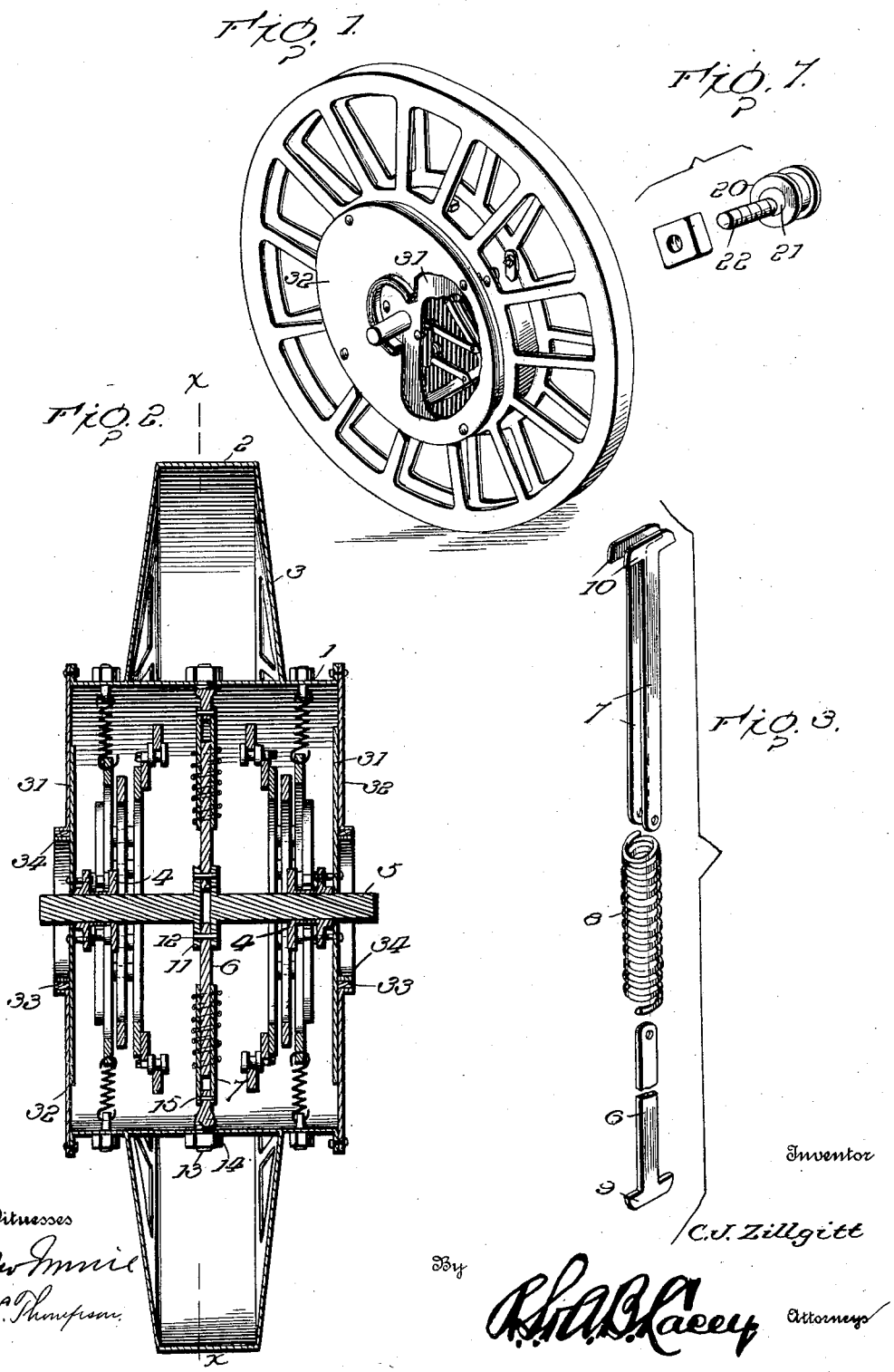
Witnesses
Inventor
C. J. Zillgitt
By
Lacey
Attorneys No. 732,684. PATENTED JUNE 30, 1903.
C. J. ZILLGITT.
SPRING WHEEL.
APPLICATION FILED FEB. 27, 1903.
NO MODEL. 2 SHEETS—SHEET 2.
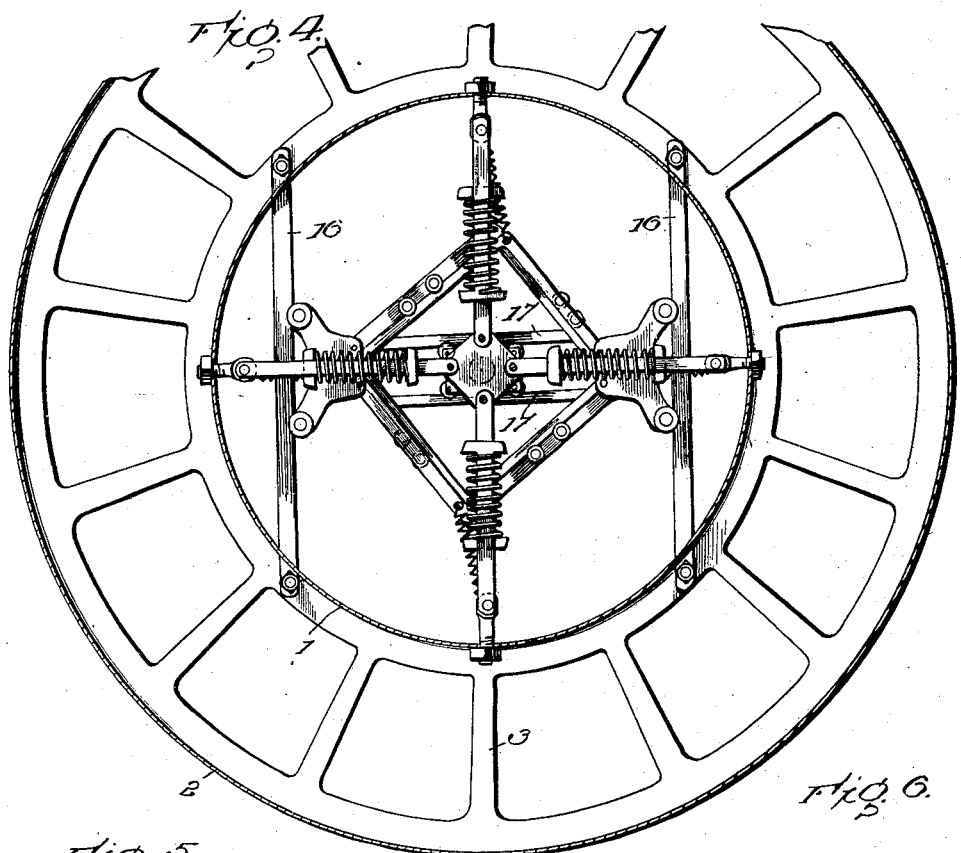
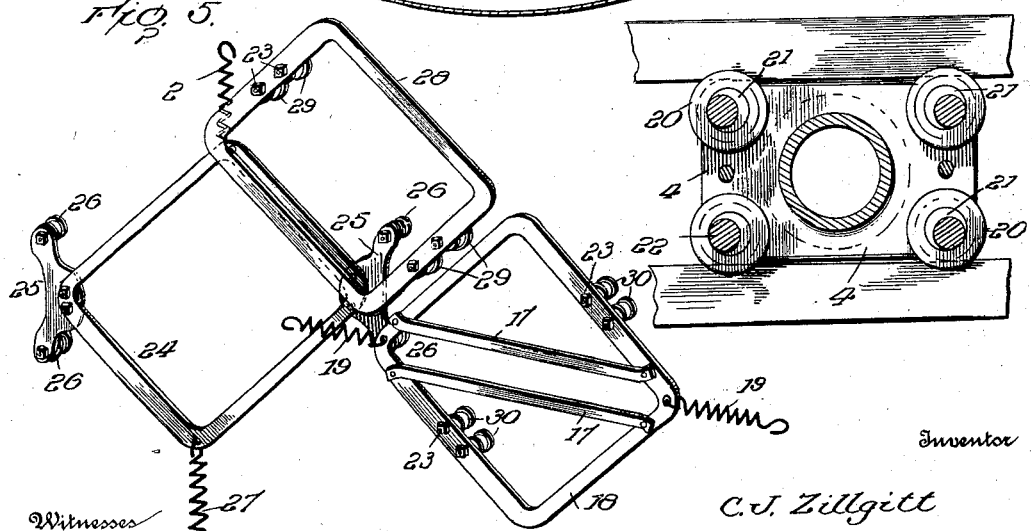

No. 732,684. Patented June 30, 1903.

UNITED STATES PATENT OFFICE.

CHARLIE J. ZILLGITT, OF LAKE CITY, MINNESOTA.

SPRING-WHEEL.

SPECIFICATION forming part of Letters Patent No. 732,684, dated June 30, 1903.

Application filed February 27, 1903. Serial No. 145,440. (No model.)

*To all whom it may concern:*

Be it known that I, CHARLIE J. ZILLGITT, a citizen of the United States, residing at Lake City, in the county of Wabasha and State of Minnesota, have invented certain new and useful Improvements in Spring-Wheels, of which the following is a specification.

This invention relates to pulleys and wheels of the type comprising separate hub and rim portions yieldingly connected and so related as to take up jar and jolt, thereby preventing injury to the parts supported or coöperating therewith.

The invention is particularly designed for vehicle-wheels and combines all the advantages of a non-puncturable tire, the yielding qualities of a cushion or pneumatic tire, and the staying properties of a rigid wheel.

For a full description of the invention and the merits thereof, and also to acquire a knowledge of the details of construction of the means for effecting the result, reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a pulley or wheel embodying the invention, a portion of the covering-plates being broken away to expose the inner parts. Fig. 2 is a vertical central section thereof on a larger scale. Fig. 3 is a perspective view of one of the compensating connections, the parts being separated. Fig. 4 is a section about on the line X X of Fig. 2, the upper portion of the pulley or wheel being broken away. Fig. 5 is a perspective view of the slide, same being separated. Fig. 6 is a detail section of the axle-box on a larger scale, showing the guides and rollers supporting same. Fig. 7 is a perspective view of a roller.

Corresponding and like parts are referred to in the following description and indicated in all the views of the drawings by the same reference characters.

The wheel or pulley, as stated, comprises hub and rim portions relatively movable and yieldingly connected. The rim portion comprises inner and outer rings 1 and 2 and connecting-spokes 3, same being of any pattern, make, or construction. In the event of the invention being applied to a vehicle-wheel the outer ring 2 constitutes the tire or tread portion and may be of any accustomed structural type, depending upon the special application of the wheel.

The hub portion of the wheel or pulley comprises a box 4 and a plurality of slides, said parts being mounted for independent movement and having yielding connection with the rim portion of the wheel. The ring 1 is of a width and diameter to comfortably receive the coördinate parts of the hub portion and the yielding connections between same and the rim portion of the wheel. The central support 5, which may be a shaft, axle, sleeve, or the like, is connected intermediate of its ends to the rim portion by compensating connections, so as to admit of said part 5 moving in all directions. The outer ends of support 5 are mounted in the boxes 4 and are movable therewith. The compensating connections between the part 5 and the rim portion of the wheel are grouped about said part 5, so as to hold same in a central position, and are sufficiently stout to sustain the load and strain. Each compensating connection comprises bar 6, companion bars 7, and coil-spring 8, embracing said bars and confined between cross-heads 9 and 10 at opposite ends thereof. The bar 6 is arranged between the bars 7 and is pivotally connected at its inner end to an outer extension 11 of part 5 at 12 and is provided with the cross-head 9 at its outer end. The bars 7 have pivotal and adjustable connection at their outer ends with the rim portion of the wheel and are provided at their inner ends with the cross-heads 10. A threaded stud 13 passes through an opening of ring 1 and receives an adjusting-nut 14 upon its outer end and is pivotally connected at its end to bars 7, as shown at 15. By turning the adjusting-nut 14 either to the right or to the left the spring 8 may be depressed more or less to vary its tension, as may be required. The springs 8 are of the open or expansible type and are adapted to be compressed by relative inward movement of the cross-heads 9 and 10, as will be readily comprehended. In the preferable construction the support 5 is composed of sections which are flanged at their inner ends, said flanges constituting the outer extension 12 and receiving between them the inner ends of bars 6. The slides and adjunctive parts are duplicated at each side of the compensating connections. Hence a detailed description of one set only will be given. Parallel guides 16 are arranged upon opposite sides of support 5, equidistant therefrom, and consist, preferably, of bars, and direct the group of slides in their reciprocating movements in one direction. A second set of guides 17 are disposed about at a right angle to the guides 16 and are applied to the outermost slide 18 of the series. Springs 19 connect the slides 18 with the rim portion of the wheel and exert a force parallel with the guides 17 and are of equal tension, so as to hold said slide about central. The box 4 is provided with rollers 20, which are mounted to travel upon the guide 17, said rollers being grooved in their peripheries to embrace opposite edge portions of said guide and mounted upon bearings 21, eccentrically disposed with reference to the stems or shanks 22, passed through openings of the box and secured in an adjusted position by clamp-nut 23. This construction admits of turning the stems or shanks 22, so as to compensate for wear between the rollers 20 and guides 17. The inner slide 24 is mounted for movement at a right angle to the travel of box 4 upon guides 17 and is provided at opposite points with cross-heads 25, having pulleys or rollers 26 at their ends to travel upon guides 16. Springs 27 connect the slides 24 with the rim portion of the wheel and exert a force about parallel with guide 16. The intermediate slide 28 is mounted so as to move at an angle of about forty-five degrees to the movement of each of the slides 18 and 24 and is provided at opposite points with rollers 29 to travel upon opposite sides of slide 24. The slide 18 is provided at opposite points with rollers 30 to engage and travel upon opposite sides of slide 28. The several rollers 26, 29, and 30 are similar in construction to rollers 20 and are mounted in a like manner, so as to admit of adjustment to take up wear. The springs 19 and 27 are right-angularly disposed and coöperate to hold the slides and box 4 central with reference to the axis of the wheel or pulley.

The parts being assembled substantially as illustrated in the accompanying drawings and hereinbefore described coöperate in the following manner: When the wheel is subjected to perpendicular strain or jolt, the hub portion moves vertically, and should the parts occupy the position substantially as shown in Fig. 4 the hub portion as a whole moves upon the guide 16. In the event of the strain or thrust being in a horizontal direction or parallel with the horizontal diameter the relative movement of the support 5 is parallel with guide 17. On the other hand, should the strain or shock be received upon the wheel at any point intermediate of the horizontal and perpendicular the relative movement of the hub and rim portions will be the resultant of the combined movements of the slides 18, 24, and 28, the slides 18 and 24 moving relatively at a right angle to each other and the slides 28 moving in a direction at a right angle to the movement of the respective slides 18 and 24. This compound movement of the yieldably-supported parts allows the rim and hub portions to move in any direction in the plane of the wheel or pulley, so as to compensate for and neutralize shock and vibration.

Plates 31 are mounted upon and secured to the support 5, so as to move therewith and fit the same snug, so as to exclude dust and foreign matter. Other plates 32 are firmly attached to the outer edges of the ring 1 and act jointly with the plates 31 to close the space circumscribed by ring 1, and their center portions are cut away to provide openings encircling support 5, so as to admit of relative play of the hub and rim portions of the wheel without interference therewith. A gasket or packing-ring 33 is fitted to the inner edge portion of plates 32, surrounding the central opening, to insure a close fit between plates 31 and 32 to prevent entrance of dust, moisture, or other foreign matter between them. A ring or band 34 confines the packing 33.

Having thus described the invention, what is claimed as new is—

1. A wheel comprising hub and rim portions, bars having pivotal connection at their outer ends with, respectively, said hub and rim portions and having their inner end portions overlapped and terminating in cross-heads, and expansible coil-springs encircling the overlapped portions of said bars and confined between the cross-heads thereof, substantially as specified.

2. In a wheel, the combination of hub and rim portions, a sectional support outwardly flanged at the inner or opposing ends of the sections, coöperating bars having pivotal connection with, respectively, the rim portion of the wheel and said flanges of the sectional support and having their inner end portions overlapped and terminating in cross-heads, and coil-springs encircling the overlapped portions of said bars and confined between the cross-heads thereof, substantially as set forth.

3. In a wheel, the combination of hub and rim portions movably related, the hub portion comprising a plurality of slides, the outermost slide mounted for right-angular movement and the intermediate slide mounted for movement in each direction at an angle intermediate of the movement of the outer slide, whereby the resultant of the movements of the series of slides admits of yielding of the rim portion of the wheel in every direction, substantially as set forth.

4. In a wheel comprising movably-related hub and rim portions, a series of three slides mounted upon one another for reciprocating movement, the outermost slide having a right-angular movement and the intermediate slide adapted to move in each direction at an angle of about forty-five degrees to the respective outermost slides, substantially as set forth.

5. In a wheel comprising movably-related hub and rim portions, parallel guides applied to the rim portion, a slide mounted to move upon said guides, springs connecting said slide with the rim portion of the wheel and exerting a force parallel with the movement of said slide, a second slide mounted upon the first slide to move in a direction of about forty-five degrees to the movement thereof, a third slide mounted upon the second slide to move in a direction at right angles to the movement thereof and at an angle of about forty-five degrees to the movement of the first-mentioned slide, and springs connecting the third slide to the rim portion of the wheel and exerting a force thereon at a right angle to the direction of movement of said first slide, substantially as specified.

6. In a wheel comprising movably-related hub and rim portions, a support, compensating connections between said support and rim portion, a plurality of slides mounted for angular movement in the plane of the wheel, spring connections between the series of slides and said rim portion, and a box for the support supported by said slides and movable therewith and independently thereof, substantially as set forth.

7. In a wheel comprising movably-related hub and rim portions, the combination of a support, compensating connections between said support and rim portion, and corresponding boxes and series of slides at each side of said compensating connections, the boxes receiving the end portions of said support and carried by the slides and the slides of each series being mounted for angular movement and being yieldably connected to the said rim portion, substantially as set forth.

8. In a wheel comprising movably-related hub and rim portions, the combination of parallel guides applied to said rim portion, a slide mounted for movement on said guides, springs connecting said slides with the rim portion, a second slide mounted for movement upon the first slide, a third slide mounted for movement upon the second slide and provided with guides at a right angle to the guides applied to the rim, springs connecting the third slide with said rim portion, and a box mounted for movement upon the guides of said third slide, substantially as set forth.

9. In combination, a rim, a central support, compensating connections between said support and rim, guides applied to the rim upon opposite sides of said compensating connection, spring-actuated slides mounted for movement upon said slides, a second set of slides mounted for movement upon the first-mentioned slides, a third set of slides mounted for movement upon said second set of slides and having spring connection with the said rim, and boxes receiving the end portions of the aforementioned support and mounted for movement upon the third set of slides in a direction at a right angle to the movement of the first-mentioned set of slides, substantially as set forth.

In testimony whereof I affix my signature in presence of two witnesses.

CHARLIE J. ZILLGITT. [L. S.]

Witnesses:
 GEO. H. ZILLGITT,
 HENRY A. BERG.